(No Model.)
G. C. HARKINS.
SKATING RINK FLOOR.
No. 299,924. Patented June 3, 1884.
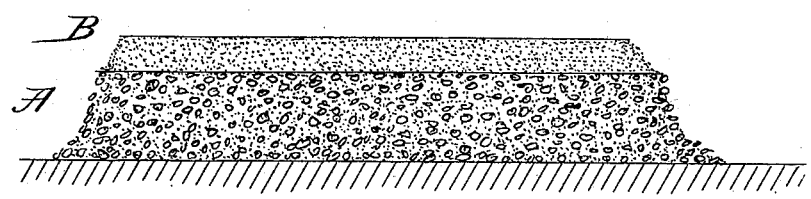
Attest:
F. H. Schott
A. R. Brown.
Inventor:
George C. Harkins
per J. C. Tacker
Atty.

UNITED STATES PATENT OFFICE.

GEORGE COLE HARKINS, OF SALT LAKE CITY, UTAH TERRITORY, ASSIGNOR OF THREE-FOURTHS TO MANUAL L. CAUSEY, EDWARD D. EGAN, AND LEILA KAIGHN.

SKATING-RINK FLOOR.

SPECIFICATION forming part of Letters Patent No. 299,924, dated June 3, 1884.

Application filed February 21, 1884. (No model.)

*To all whom it may concern:*

Be it known that I, GEORGE COLE HARKINS, a citizen of the United States, residing at Salt Lake City, in the county of Salt Lake and Territory of Utah, have invented certain new and useful Improvements in Skating-Rink Floors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in skating-rink surfaces or floors; and it consists in peculiar compounds or combination of materials and the manner of combining, laying, and hardening the same, to produce a smooth, firm, noiseless skating-floor for roller-skating, as will be hereinafter more fully described, and then specifically pointed out in the claims.

My invention is fully illustrated in the annexed drawing.

The first step in laying my improved skating-floor is to level the ground, then flood the same with water. After the ground has become partially dry, it is rolled or tamped till solid. Upon the ground thus prepared is next laid a foundation consisting of a composition or combination of materials as follows: Coarse clean gravel is mixed with sufficient Portland cement—say, about ten or fifteen per cent.— and water to make the mass cohere. A layer about three inches thick of this mixture is placed upon the ground and rammed or tamped with heavy iron-faced rammers till the mass is firm and solid. This base or foundation A is conveniently laid in strips, preferably three feet wide and ten or fifteen feet long. Upon this foundation A, while moist, is laid a surface or coating or composition, B, which forms the wearing-surface. This surface B is composed of the following materials, viz: fine, clean, sharp sand that has been passed through, say, a number 40-mesh wire screen (about forty per cent.) and Portland cement, (about sixty per cent,) mixed thoroughly while dry, and moistened to the consistency of stiff putty with water in which a small quantity of quicklime—enough to color it—has been dissolved. This compound is to be spread on the base A, or strips composing the same, to a depth of about half an inch. This surface when laid is to be sprinkled with water, worked over and made smooth and level with trowels. Next I allow the same to dry for about twenty-four hours, and afterwards sprinkle with water every twelve hours for, say, ten days before using.

It will thus be seen that my invention affords a firm, noiseless, elastic, and practically indestructible skating floor or surface, over which the rollers roll easily without any slipping sidewise, and with very little wear on the roller.

Having thus described my invention, what I claim as new, and desire to secure by Letters Patent, is—

1. The combination, in a skating-rink floor, of a foundation or base, A, composed of a compound or mixture of coarse, clean gravel with Portland cement, and water sufficient to make the mass cohere, and a top surface or dressing, B, consisting of a compound or mixture of fine, clean sand, Portland cement, water, and quicklime in the proportions specified.

2. The method of laying and forming a skating-rink floor which consists in spreading upon leveled ground a mixture or composition of coarse gravel and cement moistened with water sufficient to make the mass cohere, said foundation being laid in strips of suitable width and length, and covering the same with a surface or top-dressing composed of fine, clean, sharp sand, Portland cement, quicklime, and water in about the proportions specified.

In testimony whereof I affix my signature in presence of witnesses.

GEORGE COLE HARKINS.

Witnesses:
M. M. KAIGHN,
JOHN FIELDING,
W. A. CARTER.